United States Patent
Ho et al.

(10) Patent No.: US 8,024,393 B2
(45) Date of Patent: *Sep. 20, 2011

(54) PROCESSOR WITH IMPROVED ACCURACY FOR MULTIPLY-ADD OPERATIONS

(75) Inventors: Ying-wai Ho, Los Altos, CA (US); John L. Kelley, San Francisco, CA (US); XingYu Jiang, San Jose, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 924 days.

This patent is subject to a terminal disclaimer.

(21) Appl. No.: 11/949,418

(22) Filed: Dec. 3, 2007

(65) Prior Publication Data

US 2008/0183791 A1 Jul. 31, 2008

Related U.S. Application Data (63) Continuation of application No. 09/364,512, filed on Jul. 30, 1999, now Pat. No. 7,346,643.

(51) Int. Cl.
G06F 7/48 (2006.01)

(52) U.S. Cl. ........................................ 708/501

(58) Field of Classification Search .......... None
See application file for complete search history.

(56) References Cited

U.S. PATENT DOCUMENTS

| 3,889,107 A | 6/1975 | Sutherland |
| 4,156,279 A | 5/1979 | Wilhite |
| 4,511,990 A | 4/1985 | Hagiwara et al. |
| 4,839,846 A | 6/1989 | Hirose et al. |
| 4,866,652 A | 9/1989 | Chu et al. |
| 4,879,676 A | 11/1989 | Hansen |
| 4,967,375 A | 10/1990 | Pelham et al. |
| 4,999,789 A | 3/1991 | Fiasconaro |
| 5,012,433 A | 4/1991 | Callahan et al. |
| 5,025,407 A | 6/1991 | Gulley et al. |
| 5,038,313 A | 8/1991 | Kojima |
| 5,159,665 A | 10/1992 | Priem et al. |
| 5,185,713 A | 2/1993 | Kobunaya |
| 5,206,823 A | 4/1993 | Hesson |
| 5,212,662 A | 5/1993 | Cocanougher et al. |
| 5,220,524 A | 6/1993 | Hesson |
| 5,257,216 A | 10/1993 | Sweedler |
| 5,278,949 A | 1/1994 | Thayer |

(Continued)

FOREIGN PATENT DOCUMENTS

EP 0 747 861 A1 12/1996

(Continued)

OTHER PUBLICATIONS

3DNow!™ Technology manual, Advanced Micro Devices, 1998, pp. i-x and 1-62 (72 pages total).

(Continued)

*Primary Examiner* — David H Malzahn (74) *Attorney, Agent, or Firm* — Sterne, Kessler, Goldstein & Fox P.L.L.C.

(57) ABSTRACT

Floating-point processors capable of performing multiply-add (Madd) operations and incorporating improved intermediate result handling capability. The floating-point processor includes a multiplier unit coupled to an adder unit. In a specific operating mode, the intermediate result from the multiplier unit is processed (i.e., rounded but not normalized or denormalized) into representations that are more accurate and easily managed in the adder unit. By processing the intermediate result in such manner, accuracy is improved, circuit complexity is reduced, operating speed may be increased.

26 Claims, 6 Drawing Sheets

U.S. PATENT DOCUMENTS

| | | |
|---|---|---|
| 5,341,321 A | 8/1994 | Karp et al. |
| 5,357,599 A | 10/1994 | Luken |
| 5,359,548 A | 10/1994 | Yoshizawa et al. |
| 5,367,650 A | 11/1994 | Sharangpani et al. |
| 5,392,228 A | 2/1995 | Burgess et al. |
| 5,420,966 A | 5/1995 | Silverbrook |
| 5,420,971 A | 5/1995 | Westerink et al. |
| 5,428,716 A | 6/1995 | Brokenshire et al. |
| 5,444,838 A | 8/1995 | Kommrusch et al. |
| 5,511,016 A | 4/1996 | Béchade |
| 5,517,438 A | 5/1996 | Dao-Trong et al. |
| 5,530,663 A | 6/1996 | Garcia et al. |
| 5,550,767 A | 8/1996 | Taborn et al. |
| 5,550,768 A | 8/1996 | Ogilvie et al. |
| 5,553,015 A | 9/1996 | Elliott et al. |
| 5,581,796 A | 12/1996 | Koga et al. |
| 5,602,769 A | 2/1997 | Yu et al. |
| 5,619,198 A | 4/1997 | Blackham et al. |
| 5,631,859 A | 5/1997 | Markstein et al. |
| 5,652,875 A | 7/1997 | Taylor |
| 5,657,045 A | 8/1997 | Katsura et al. |
| 5,671,170 A | 9/1997 | Markstein et al. |
| 5,671,401 A | 9/1997 | Harrell |
| 5,701,442 A | 12/1997 | Ronen |
| 5,720,019 A | 2/1998 | Koss et al. |
| 5,726,927 A | 3/1998 | Wolrich et al. |
| 5,729,724 A | 3/1998 | Sharangpani et al. |
| 5,757,321 A | 5/1998 | Billyard |
| 5,764,555 A | 6/1998 | McPherson et al. |
| 5,767,859 A | 6/1998 | Rossin et al. |
| 5,768,170 A | 6/1998 | Smith |
| 5,774,709 A | 6/1998 | Worrell |
| 5,777,625 A | 7/1998 | Rossin |
| 5,790,827 A | 8/1998 | Leung |
| 5,793,661 A | 8/1998 | Dulong et al. |
| 5,802,336 A | 9/1998 | Peleg et al. |
| 5,805,486 A | 9/1998 | Sharangpani |
| 5,809,294 A | 9/1998 | Ando |
| 5,815,695 A | 9/1998 | James et al. |
| 5,847,979 A | 12/1998 | Wong et al. |
| 5,848,269 A | 12/1998 | Hara |
| 5,852,443 A | 12/1998 | Kenworthy |
| 5,852,726 A | 12/1998 | Lin et al. |
| 5,862,066 A | 1/1999 | Rossin et al. |
| 5,867,413 A | 2/1999 | Yeh |
| 5,867,682 A | 2/1999 | Witt et al. |
| 5,880,983 A | 3/1999 | Elliott et al. |
| 5,880,984 A | 3/1999 | Burchfiel et al. |
| 5,889,690 A | 3/1999 | Arakawa |
| 5,892,698 A | 4/1999 | Naffziger |
| 5,901,076 A | 5/1999 | Lynch |
| 5,923,577 A | 7/1999 | Wong et al. |
| 5,928,316 A | 7/1999 | Wong et al. |
| 5,933,153 A | 8/1999 | Deering et al. |
| 5,953,241 A | 9/1999 | Hansen et al. |
| 5,977,987 A | 11/1999 | Duluk, Jr. |
| 5,982,380 A | 11/1999 | Inoue et al. |
| 5,990,904 A | 11/1999 | Griffin |
| 5,995,122 A | 11/1999 | Hsieh et al. |
| 5,996,066 A | 11/1999 | Yung |
| 5,999,960 A | 12/1999 | Gerwig et al. |
| 6,035,316 A | 3/2000 | Peleg et al. |
| 6,052,129 A | 4/2000 | Fowler et al. |
| 6,065,115 A | 5/2000 | Sharangpani et al. |
| 6,115,729 A | 9/2000 | Matheny et al. |
| 6,169,554 B1 | 1/2001 | Deering |
| 6,175,370 B1 | 1/2001 | Kunimatsu |
| 6,175,851 B1 | 1/2001 | Iourcha et al. |
| 6,175,907 B1 | 1/2001 | Elliott et al. |
| 6,199,089 B1 | 3/2001 | Mansingh |
| 6,249,798 B1 | 6/2001 | Golliver et al. |
| 6,268,875 B1 | 7/2001 | Duluk, Jr. et al. |
| 6,269,385 B1 | 7/2001 | Han et al. |
| 6,275,838 B1 | 8/2001 | Blomgren et al. |
| 6,279,099 B1 | 8/2001 | Van Hook et al. |
| 6,285,378 B1 | 9/2001 | Duluk, Jr. |
| 6,285,779 B1 | 9/2001 | Lapidous et al. |
| 6,298,365 B1 | 10/2001 | Dubey et al. |
| 6,401,108 B1 | 6/2002 | Van Nguyen |
| 6,414,683 B1 | 7/2002 | Gueziec |
| 6,426,746 B2 | 7/2002 | Hsieh et al. |
| 6,510,446 B1 | 1/2003 | Fukagawa |
| 6,535,898 B1 | 3/2003 | Yuval |
| 6,570,570 B1 | 5/2003 | Suzuki et al. |
| 6,581,087 B1 | 6/2003 | Inoue et al. |
| 6,621,493 B1 | 9/2003 | Whitten |
| 6,631,392 B1 | 10/2003 | Jiang et al. |
| 6,697,832 B1 | 2/2004 | Kelley et al. |
| 6,714,197 B1 | 3/2004 | Thekkath et al. |
| 6,732,259 B1 | 5/2004 | Thekkath et al. |
| 6,753,866 B2 | 6/2004 | Suzuki et al. |
| 6,912,559 B1 | 6/2005 | Ho et al. |
| 6,996,596 B1 | 2/2006 | Ho et al. |
| 7,117,342 B2 | 10/2006 | Tremblay et al. |
| 7,242,414 B1 | 7/2007 | Thekkath et al. |
| 7,301,541 B2 | 11/2007 | Hansen et al. |
| 7,346,643 B1 | 3/2008 | Ho et al. |
| 7,724,261 B2 | 5/2010 | Thekkath et al. |
| 2002/0116431 A1 | 8/2002 | Ho et al. |
| 2008/0091758 A1 | 4/2008 | Hansen et al. |
| 2008/0091925 A1 | 4/2008 | Hansen et al. |

FOREIGN PATENT DOCUMENTS

| | | |
|---|---|---|
| JP | 1-282633 A | 11/1989 |
| JP | 2-091724 A | 3/1990 |
| JP | 3-278124 A | 12/1991 |
| JP | 9-146924 A | 6/1997 |
| JP | 11-102353 A | 4/1999 |
| JP | 2001-175880 A | 6/2001 |
| WO | WO 97/05575 A1 | 2/1997 |

OTHER PUBLICATIONS

AltiVec™ Technology Programming Environments manual, Preliminary REV 0.2, May 1998, pp. 4-16 thru 4-19 (4 pages total).

Diefendorff, Keith et al., "AltiVec Extension to PowerPC Accelerates Media Processing," IEEE Micro, pp. 85-95, Mar.-Apr. 2000.

Heinrich, Joe, MIPS R4000 Microprocessor, User's manual, Second Edition, MIPS Technologies, 1994, pp. 154-155, 157, 159, 161, 168, 170-171, B-13, B-17, B-19, B-21, B-23, B-27, B-38, B-40 and B-62 (19 pages total). Note: The page count of this document was cited to us as listed here in an International Search Report from a MIPS PCT Application.

Higakl et al., A 2.5 GFLOPS 6.5 Million Polygons Per Second 4-Way VLIW Geometry Processor With SIMD Instructions and a Software Bypass Mechanism, Nakahara-ku, Kawaski, Japan.

Higaki et al., "A 2.5 GFLOPS 6.5 Million Polygons per Second 4-Way VLIW Geometry Processor with SIMD Instructions and a Software Bypass Mechanism," IEEE International Solid-State Circuits Conference, 1999.

Higaki et al., Four-Way VLIW Geometry Processor for 3D Graphics Applications, Dec. 1, 1999, p. 39-47.

Hughes, PL.I Programming, 1973, John Wiley & Sons, pp. 5, 15-16, 74-75, 188-189, 217, 411-416, 423-424, and 689-690.

IEEE Standard for Binary Floating-Point Arithmetic.

Ito, Masayuki et al., "Efficient Initial Approximation for Multiplicative Division and Square Root by Multiplication with Operand Modification," IEEE Transactions on Computers, vol. 46, No. 4, Apr. 1997, pp. 495-498.

Kubosawa et al., "A 2.5-GFLOPS, 6.5 Million Polygons per Second, Four-Way VLIW Geometry Processor with SIMD Instructions and a Software Bypass Mechanism," IEEE Journal of Solid-State Circuits, vol. 34, No. 11, pp. 1619-1626, Nov. 1999.

Kubosawa et al., "Four-Way VLIW Geometry Processor for 3D Graphics Applications," Dec. 1, 1999, p. 39-47.

"MIPS Extension for Digital Media with 3D," MIPS Techniques, Inc., pp. 1-26, Dec. 27, 1996.

Oberman et al., "AMD 3DNow! Technology and the K6-2 Microprocessor" (presentation), Proceeding Notebook for Hot Chips 10, Aug. 16-18, 1998 (pp. 245-254).

Rice et al., "Multiprecision Division on an 8-Bit Processor," Computer Arithmetic, 1997 (Proceedings, $13^{th}$ IEEE Symposium on Jul. 6-9, 1997, pp. 74-81).

Thekkath et al., "An Architecture Extension for Efficient Geometry Processing," pp. 1-23, Presented at Hot Chips 11, A Symposium of High-Performance Chips, Stanford Univ. (Aug. 1999) (submitted for conference review Jul. 14, 1999).

TMS32010 User's Guide, Texas Instruments, 1983, pp. 1183.

Uhler, M., "Optimizing Game Applications for the MIPS RISC Architecture," 1999 Computer Game Developer's Conference, San Jose, CA, 14 pages (Mar. 1999) (submitted for conference revview on Feb. 12, 1999).

Uhler, M., "Optimizing Game Applications for the MIPS RISC Architecture," 1999 Computer Game Developer's Conference, San Jose, CA, slides 1-22 (Mar. 1999).

English language abstract of JP 1-282633 A, published Nov. 14, 1989, 1 page, data supplied by ep.espacenet.com.

English language abstract of JP 2-091724 A, published Mar. 30, 1990, 1 page, data supplied by ep.espacenet.com.

English language abstract of JP 3-278124 A, published Dec. 9, 1991, 1 page, data supplied by ep.espacenet.com.

English language abstract of JP 9-146924 A, published Jun. 6, 1997, 1 page, data supplied by ep.espacenet.com.

English language abstract of JP 11-102353 A, published Apr. 13, 1999, 1 page, data supplied by ep.espacenet.com.

English language abstract of JP 2001-175880 A, published Jun. 29, 2001, 1 page, data supplied by ep.espacenet.com.

*AltiVec Technology Fact Sheet*, Motorola, Inc., 2 pages (1998).

*AltiVec Technology Programming Environments Manual*, Preliminary Rev. 0.2, Motorola, Inc., pp. i-viii, xi-xviii, 1-1 thru 1-11, 4-16 thru 4-33, 6-82, 6-122, 6-135, and 6-143 (May 1998).

*AltiVec Technology Programming Environments Manual*, Rev. 0.1, Motorola, Inc., 164 pages (Nov. 1998).

*AltiVec Technology Programming Interface Manual*, Rev. 0, Motorola, Inc., 261 pages (Jun. 1999).

Eldon, J., "A 22-hit floating point registered arithmetic logic unit," *IEEE Int'l Conference on Acoustics, Speech, and Signal Processing*, vol. 8, pp. 943-946 (Apr. 1983).

Fayyad, U.M. et al. (eds.), *Advances in Knowledge Discovery and Data Mining*, AAAI/MIT Press, pp. 307-328 (1996).

Fuller, S., *Motorola's AltiVec™ Technology*, [white paper], Motorola, 4 pages (1998).

*IEEE Standard for Binary Floating-Point Arithmetic*, IEEE Std 754-1985, American National Standards Institute, An American National Standard, New York, New York, pp. i-vi and 1-14 (1985).

*MIPS Extension for Digital Media with 3D*, MIPS Technologies, Inc., 29 pages (Mar. 1997).

*MIPS IV Instruction Set*, Revision 3.2, MIPS Technologies, Inc., pp. B-21, B-22, B-26, B-28, B-38 thru B-42, B-47 thru B-49, B-55, B-95, and B-96 (Sep. 1995).

*MIPS V Instruction Set*, Rev. 1.0, MIPS Technologies, Inc., pp. B-1 thru B-37 (1996).

*MIPS® RISC Architecture, vol. 1, Introduction to the ISA*, MIPS Technologies, Inc., 344 pages (Aug. 1998).

*MIPS® RISC Architecture, vol. 2, The Instruction Set*, MIPS Technologies, Inc., 614 pages (Aug. 1998).

Price, C., *MIPS IV Instruction Set*, Revision 3.2, MIPS Technologies, Inc., pp. B-21, B-22, B-26, B-47 thru B-49, B-63, B-81, B-84, B-88, and B-96 (Sep. 1995).

Price, C., *MIPS R10000 MIPS IV ISA Manual—Andes*, Rev. 3.2, MIPS Technologies, Inc., 323 pages (Sep. 1995).

Sweetman, D., *See MIPS Run*, Morgan Kaufmann Publishers, Inc., San Francisco, CA, pp. v-xviii, 91-114, 149-173, and 201-242 (1999).

Search Report, dated Jul. 20, 2000, for PCT Appl. No. PCT/US00/03900, filed Feb. 14, 2000, 4 pages.

Written Opinion, dated Jan. 11, 2001, for PCT Appl. No. PCT/US00/03900, filed Feb. 14, 2000, 5 pages.

Search Report, dated Oct. 12, 2000, for PCT Appl. No. PCT/US00/20160, filed Jul. 24, 2000, 5 pages.

Written Opinion, dated Apr. 30, 2001, for PCT Appl. No. PCT/US00/20160, filed Jul. 24, 2000, 5 pages.

English Translation of Notice of Reasons of Rejection, mailed Oct. 28, 2009, for Japanese Patent Appl. No. 2001-514658, 6 pages.

Office Communication, dated Mar. 22, 2002, for U.S. Appl. No. 09/363,637, filed Jul. 30, 1999, 4 pages.

Office Communication, dated Sep. 11, 2002, for U.S. Appl. No. 09/363,637, filed Jul. 30, 1999, 4 pages.

Office Communication, dated Apr. 15, 2003, for U.S. Appl. No. 09/363,637, filed Jul. 30, 1999, 6 pages.

Decision on Appeal, dated Apr. 23, 2004, for U.S. Appl. No. 09/363,637, filed Jul. 30, 1999, 10 pages.

Office Communication, dated Jun. 30, 2004, for U.S. Appl. No. 09/363,637, filed Jul. 30, 1999, 4 pages.

Office Communication, dated Feb. 20, 2002, for U.S. Appl. No. 09/363,638, filed Jul. 30, 1999, 6 pages.

Office Communication, dated Jul. 19, 2002, for U.S. Appl. No. 09/363,638, filed Jul. 30, 1999, 5 pages.

Office Communication, dated Sep. 6, 2002, for U.S. Appl. No. 09/363,638, filed Jul. 30, 1999, 2 pages.

Office Communication, dated Dec. 21, 2001, for U.S. Appl. No. 09/364,514, filed Jul. 30, 1999, 6 pages.

Office Communication, dated Jul. 8, 2002, for U.S. Appl. No. 09/364,786, filed Jul. 30, 1999, 9 pages.

Office Communication, dated Dec. 31, 2002, for U.S. Appl. No. 09/364,786, filed Jul. 30, 1999, 10 pages.

Office Communication, dated Jul. 1, 2003, for U.S. Appl. No. 09/364,786, filed Jul. 30, 1999, 15 pages.

Office Communication, dated Feb. 11, 2004, for U.S. Appl. No. 09/364,786, filed Jul. 30, 1999, 9 pages.

Office Communication, dated Nov. 4, 2004, for U.S. Appl. No. 09/364,786, filed Jul. 30, 1999, 13 pages.

Office Communication, dated Jan. 26, 2005, for U.S. Appl. No. 09/364,786, filed Jul. 30, 1999, 1 page.

Office Communication, dated Jun. 6, 2005, for U.S. Appl. No. 09/364,786, filed Jul. 30, 1999, 13 pages.

Office Communication, dated Dec. 13, 2005, for U.S. Appl. No. 09/364,786, filed Jul. 30, 1999, 14 pages.

Office Communication, dated Sep. 19, 2006, for U.S. Appl. No. 09/364,786, filed Jul. 30, 1999, 12 pages.

Office Communication, dated Dec. 12, 2006, for U.S. Appl. No. 09/364,786, filed Jul. 30, 1999, 4 pages.

Office Communication, dated Mar. 27, 2002, for U.S. Appl. No. 09/364,787, filed Jul. 30, 1999, 11 pages.

Office Communication, dated Sep. 24, 2002, for U.S. Appl. No. 09/364,787, filed Jul. 30, 1999, 10 pages.

Office Communication, dated Aug. 12, 2003, for U.S. Appl. No. 09/364,787, filed Jul. 30, 1999, 5 pages.

Office Communication, dated Dec. 3, 2001, for U.S. Appl. No. 09/364,789, filed Jul. 30, 1999, 6 pages.

Office Communication, dated Aug. 14, 2002, for U.S. Appl. No. 09/364,789, filed Jul. 30, 1999, 8 pages Office Communication, dated Feb. 20, 2003, for U.S. Appl. No. 09/577,238, filed May 23, 2000, 10 pages.

Office Communication, dated Aug. 18, 2003, for U.S. Appl. No. 09/577,238, filed May 23, 2000, 12 pages.

Office Communication, dated Apr. 20, 2004, for U.S. Appl. No. 09/577,238, filed May 23, 2000, 7 pages.

Office Communication, dated Nov. 19, 2004, for U.S. Appl. No. 09/577,238, filed May 23, 2000, 4 pages.

Office Communication, dated May 26, 2005, for U.S. Appl. No. 09/577,238, filed May 23, 2000, 5 pages.

Office Communication, dated Oct. 24, 2002, for U.S. Appl. No. 10/055,346, filed Jan. 25, 2002, 4 pages.

Office Communication, dated Apr. 8, 2003, for U.S. Appl. No. 10/055,346, filed Jan. 25, 2002, 4 pages.

Office Communication, dated Sep. 10, 2003, for U.S. Appl. No. 10/055,346, filed Jan. 25, 2002, 5 pages.

Office Communication, dated Apr. 4, 2008, for U.S. Appl. No. 11/806,845, filed Jun. 4, 2007, 5 pages.

Office Communication, dated Oct. 8, 2008, for U.S. Appl. No. 11/806,845, filed Jun. 4, 2007, 8 pages.

Office Communication, dated Apr. 15, 2009, for U.S. Appl. No. 11/806,845, filed Jun. 4, 2007, 8 pages.

Office Communication, dated Nov. 10, 2009, for U.S. Appl. No. 11/806,845, filed Jun. 4, 2007, 9 pages.

Office Communication, dated Jan. 28, 2010, for U.S. Appl. No. 11/806,845, filed Jun. 4, 2007, 8 pages.

| EXPONENT | MANTISSA | |
|---|---|---|
| 1 1 1 ... 1 1 0 | 1 1 1 ... 1 1 1 | largest normalized # ($a_{max}$) |
| 1 1 1 ... 1 1 0 | 1 1 1 ... 1 1 0 | |
| 1 1 1 ... 1 1 0 | 0 0 0 ... 0 0 0 | |
| 1 1 1 ... 1 0 1 | 1 1 1 ... 1 1 1 | |
| 0 1 1 ... 1 1 1 | 0 0 0 ... 0 0 0 | smallest # > 1.0 |
| 0 1 1 ... 1 1 0 | 1 1 1 ... 1 1 1 | largest # < 1.0 |
| 0 0 0 ... 0 0 1 | 0 0 0 ... 0 0 1 | |
| 0 0 0 ... 0 0 1 | 0 0 0 ... 0 0 0 | smallest normalized # ($a_{min}$) |

FIG. 5A

| EXPONENT | MANTISSA | |
|---|---|---|
| 0 0 0 ... 0 0 0 | 1 1 1 ... 1 1 1 | |
| 0 0 0 ... 0 0 0 | 1 1 1 ... 1 1 0 | |
| 0 0 0 ... 0 0 0 | 1 0 0 ... 0 0 0 | denormalized numbers |
| 0 0 0 ... 0 0 0 | 0 1 1 ... 1 1 1 | |
| 0 0 0 ... 0 0 0 | 0 0 0 ... 0 0 1 | |
| 0 0 0 ... 0 0 0 | 0 0 0 ... 0 0 0 | zero (0.0) |

| FCC | | | | | | | | FS | FCC | FO | | | CAUSE | | | | | ENABLES | | | | | FLAGS | | | | RM | |
|---|---|---|---|---|---|---|---|---|---|---|---|---|---|---|---|---|---|---|---|---|---|---|---|---|---|---|---|---|
| 7 | | | | | | | | 1 | 1 | 1 | | 4 | | 6 | | | | | 5 | | | | | 5 | | | | 2 | |
| 7 | 6 | 5 | 4 | 3 | 2 | 1 | | | 0 | | | | E | V | Z | O | U | I | V | Z | O | U | I | V | Z | O | U | I | |
| 31 | 30 | 29 | 28 | 27 | 26 | 25 | | 24 | 23 | 22 | 21 | 18 | 17 | 16 | 15 | 14 | 13 | 12 | 11 | 10 | 9 | 8 | 7 | 6 | 5 | 4 | 3 | 2 | 1 0 |

PROCESSOR WITH IMPROVED ACCURACY FOR MULTIPLY-ADD OPERATIONS

CROSS REFERENCE TO RELATED APPLICATIONS

This application is a continuation application of U.S. Non-Provisional Application No. 09/364,512, entitled "Processor with Improved Accuracy for Multiply-Add Operations," filed Jul. 30, 1999, now U.S. Pat. No. 7,346,643, which is hereby incorporated by reference herein in its entirety for all purposes.

The following related patent applications filed on the same day herewith are hereby incorporated by reference in their entirety for all purposes:

U.S. patent application Ser. No. 09/364,514, entitled "Floating-Point Processor with Improved Intermediate Result Handling," now U.S. Pat. No. 6,697,832;

U.S. patent application Ser. No. 09/363,638, entitled "Method and Apparatus for Predicting Floating-Point Exceptions," now U.S. Pat. No. 6,631,392;

U.S. patent application Ser. No. 09/363,637, entitled "System and Method for Improving the Accuracy of Reciprocal and Reciprocal Square Root Operations Performed by a Floating-Point Unit," now U.S. Pat. No. 6,912,559;

U.S. patent application Ser. No. 09/364,786, entitled "Processor Having a Compare Extension of an Instruction Set Architecture," now U.S. Pat. No. 7,242,414;

U.S. patent application Ser. No. 09/364,789, entitled "Processor Having a Conditional Branch Extension of an Instruction Set Architecture," now U.S. Pat. No. 6,732,259; and U.S. patent application Ser. No. 09/364,787, entitled "Processor Having an Arithmetic Extension of an Instruction Set Architecture," now U.S. Pat. No. 6,714,197.

BACKGROUND OF THE INVENTION

1. Field of the Invention

The present invention relates to floating-point processors, and more particularly to floating-point processors having improved accuracy for multiply-add (Madd) operations.

2. Background Art

In digital processing systems, numerical data is typically expressed using integer or floating-point representation. Floating-point representation is preferred in many applications because of its ability to express a wide range of values and its ease of manipulation for some specified operations. A floating-point representation typically includes three components: a sign bit (sign), a mantissa (mant) that is sometimes referred to as a significand, and an exponent (exp). The represented floating-point number can be expressed as $(-1)^{sign} \cdot mant \cdot 2^{exp}$. Floating-point representations are also defined by "IEEE Standard for Binary Floating-Point Arithmetic," which is referred to herein as the IEEE-754 standard (or simply the IEEE standard) and incorporated herein by reference in its entirety for all purposes.

Many operations can be performed on floating-point numbers, including arithmetic operations such as addition, subtraction, and multiplication. For arithmetic operations, the IEEE standard provides guidelines to be followed to generate a unique answer for each floating-point operation. In particular, the IEEE standard describes the processing to be performed on the result from a particular operation (e.g., multiply, add), the precision of the resultant output, and the data format to be used. For example, the IEEE standard defines several rounding modes available for the results from add and multiply operations, and the bit position at which the rounding is to be performed. The requirements ensure identical results from different implementations of IEEE-compliant floating-point processors.

Many applications perform multiplication on two operands and addition (or subtraction) of the resultant product with a third operand. This multiply-add (or Madd) operation is common, for example, in digital signal processing where it is often used for computing filter functions, convolution, correlation, matrix transformations, and other functions. The Madd operation is also commonly used in geometric computation for (3-D) graphics applications.

Conventionally, a Madd operation can be achieved by sequentially performing a multiply (MUL) operation followed by an add (ADD) operation. Performing the operations sequentially results in long processing delay. Improved performance can often be obtained by performing the Madd operation using a specially designed unit that also supports conventional floating-point multiplication and addition.

For Madd operations, post-processing is typically performed on the intermediate result from the multiply portion. To obtain a final Madd output that fulfills IEEE rounding requirement, the post-processing includes possible denormalization and rounding of the intermediate result in accordance with one of the rounding modes defined by the IEEE standard. Denormalization is performed on a denormalized number (i.e., a non-zero number between the smallest positive representable normalized number, $+a_{min}$, and the smallest negative representable normalized number, $-a_{min}$) to place the denormalized number in a proper format such that rounding can be performed at the bit location specified by the IEEE standard. The post-processing (or more specifically, the denormalization and rounding) to generate an IEEE-compliant Madd result typically lead to reduced accuracy (since some bits may be discarded during the denormalization and rounding), increased hardware complexity, and increased processing time. To reduce hardware complexity and improve processing time, some Madd architectures provide an additional operating mode in which numbers (e.g., intermediate results) smaller than the smallest representable normalized number are set or flushed to zero, or some other values such as $a_{min}$. However, the flush-to-zero mode suffers from a higher loss in accuracy since the mantissa is replace with zero or some other predefined minimum value.

Accordingly, for Madd operations, techniques that increase the accuracy of the output result, simplify the post-processing of the intermediate result, and reduce the overall processing time are highly desirable.

BRIEF SUMMARY OF THE INVENTION

The invention provides a floating-point processors capable of performing multiply-add (Madd) operations and having improved accuracy, reduced circuit complexity, and possibly enhanced operating speed. Improved performance is achieved by processing the intermediate result from the multiplier unit, when operating in a specified operating mode, in a particular manner. Specifically, the intermediate result is rounded but not normalized or denormalized, as described in detail below.

An embodiment of the invention provides a floating-point unit (FPU) configurable to perform multiply-add (Madd) operations. The FPU includes a multiplier unit coupled to an adder unit. The multiplier unit receives and multiplies the mantissas for the first and second operands to generate a multiplier output mantissa. The multiplier unit is configurable to operate in a first operating mode defined by the multiplier output mantissa being rounded and having a pseudo-normalized format. The adder unit couples to the multiplier unit and receives and combines the multiplier output mantissa and a mantissa for a third operand to generate a FPU output mantissa.

In an embodiment, the pseudo-normalized format is characterized by at least one bit to the left of a binary point having a value of one. The multiplier output mantissa can be rounded at a bit position defined by IEEE standard, and can also be rounded without regard to its associated exponent.

The multiplier unit can be designed to selectively operate in one of a number of operating modes. Besides the first operating mode described above, a second operating mode can be defined by the multiplier output mantissa being in conformance with the IEEE standard. In this mode, the multiplier output mantissa is normalized or denormalized, as necessary, and rounded in accordance with the IEEE standard. A third operating mode can be defined by the multiplier output mantissa being flushed to zero or other predefined values when a denormalized multiplier output is detected. The operating mode can be selected by a value stored in a control register, a control signal, or some other mechanisms.

The FPU can provide improved performance when configured to execute a set of operations designed to approximate a reciprocal of a number or a reciprocal square root of a number. These approximation can be performed in accordance with a Newton-Raphson algorithm.

Yet another embodiment of the invention provides a floating-point processor configurable to perform Madd operations. The floating-point processor includes a multiplier unit coupled to an adder unit. The multiplier unit includes a multiplier array operatively coupled to a first rounding unit. The multiplier array receives and multiplies mantissas for two operands. The first rounding unit is configurable to round an output from the multiplier array to generate a rounded multiplier output mantissa having a pseudo-normalized format. The adder unit includes a carry propagation adder (CPA), a second rounding unit, and a normalization unit. The CPA receives and combines the multiplier output mantissa and a mantissa for a third operand. The second rounding unit couples to the CPA and receives and rounds the mantissa from the CPA. The normalization unit couples to the second rounding unit and receives and normalizes the rounded mantissa. Within the multiplier unit, another CPA can be coupled between the multiplier array and the first rounding unit, to receive and combine a sum output and a carry output from the multiplier array.

The FPU and floating-point processor described above typically include additional units to process the exponents for the operands. The FPU and floating-point processor can be incorporated within a microprocessor or other hardware structure, and can also be described and/or implemented using hardware design languages (e.g., Verilog).

Yet another embodiment of the invention provides a method for performing a floating-point Madd operation. In accordance with the method, the mantissas for two operands are multiplied to generate a third mantissa, which is then rounded to generate a fourth mantissa. The fourth mantissa has a pseudo-normalized format and a range greater than a normalized mantissa. The fourth mantissa is combined with a mantissa for a third operand to generate an output mantissa. The output mantissa can further be rounded and normalized to generate a representation that conforms to the IEEE standard.

The invention also provides computer program products that implement the embodiments described above.

The foregoing, together with other aspects of this invention, will become more apparent when referring to the following specification, claims, and accompanying drawings.

DETAILED DESCRIPTION OF THE INVENTION

Figure 1:
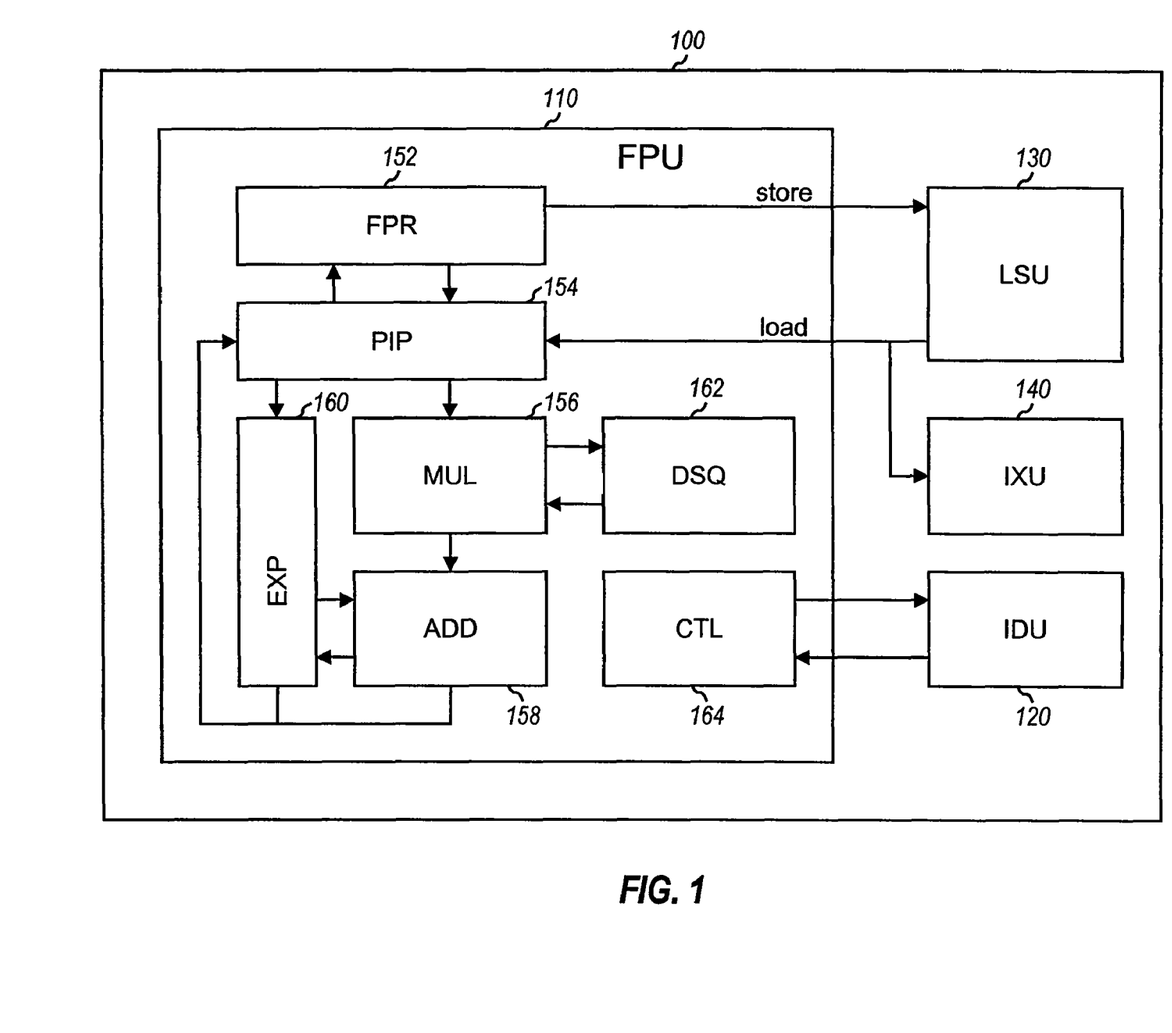
FIG. 1 shows a simplified diagram of an embodiment of a processor that incorporates a floating-point unit (FPU) of the invention.

FIG. 1 shows a simplified diagram of an embodiment of a processor 100 that incorporates a floating-point unit (FPU) 110 of the invention. As shown in the specific embodiment in FIG. 1, processor 100 further includes an instruction dispatch unit (IDU) 120, a load store unit (LSU) 130, and an integer execution unit (IXU) 140. IDU 120 decodes a sequence of instructions, dispatches floating-point instructions to FPU 110, and keeps track of the state of each dispatched floating-point instruction, resource and register dependencies, and the possibility of bypassing a resultant operand to the next FPU instruction. FPU 110 performs floating-point computations, as directed by IDU 120. LSU 130 interfaces with other elements (i.e., internal or external to processor 100) and provides data to, and receives data from FPU 110. For example, operands are loaded from LSU 130 to FPU 110 and results are provided from FPU 110 to LSU 130. IXU 140 performs integer computations, and is able to transfer data to, and receive data from FPU 110.

FIG. 1 also shows a block diagram of an embodiment of FPU 110. FPU 110 includes a floating-point register file (FPR) 152 that interfaces with LSU 130. FPR 152 includes a number of read ports (i.e., for reading up to three operands for each arithmetic operation and one operand for a store operation) and a number of write ports (i.e., for writing one operand for each arithmetic and load operation).

A floating-point pipe file (PIP) 154 couples to FPR 152 and further interfaces with LSU 130 and IXU 140. For each instruction, PIP 154 selects and receives operands from FPR 152, a load pipe file, a result pipe file, or a ROM. PIP 154 then unpacks the received operands (i.e., from an IEEE-compliant format) into an internal data format recognized by the processing units within FPU 110. PIP 154 also packs the results from FPU 110 into a data format (i.e., IEEE-compliant format) required by the external circuitry and provides the packed results to FPR 152.

A floating-point multiplier (MUL) 156 couples to PIP 154 and executes floating-point multiply instructions as well as the multiply portion of compound instructions such as a multiply-add (MADD) instruction. MUL 156 receives the mantissas of two operands from PIP 154. In an embodiment, MUL 156 is implemented with a multiplier array that generates a set of sum and carry outputs having full precision. The sum and carry are provided to, and combined in a carry-propagate adder (CPA) to generate a precise, unrounded resultant mantissa. The lower bits of the resultant mantissa are logically combined to form a "sticky" bit that, in combination with the round bit and the current rounding mode, are used to generate rounding information to be sent to a subsequent rounding unit within MUL 156. MUL 156 is described in further detail below.

A floating-point adder (ADD) 158 couples to PIP 154 and MUL 156. ADD 158 executes floating-point add and subtract instructions as well as the add portion of compound instructions such as MADD. ADD 158 receives two operands and performs floating-point magnitude addition/subtraction using, for example, a prescale adder (PSA) operated in parallel with a massive cancellation adder (MCA). The final output is selected from one of the adders and provided to PIP 154 for storage. In one embodiment, adder selection is based upon the exponent difference of the subject operands and the first few bits of the mantissas of such operands (i.e., the integer bit(s) and the most significant bit of the fractional portion) so that: (1) the PSA is always used for addition and selectively used for subtraction when the result is guaranteed to be no less than 0.1000000 before rounding and normalization and (2) the MCA is selectively used for subtraction when the result is guaranteed to be less than 1.0 and may have a large number of leading zeros before rounding and normalization. Operands that satisfy both conditions may be processed by either the PSA or MCA. Often, this selection criteria results in selection of the PSA for additions and subtractions when the difference between operand exponents is greater than two, and the selection of the MCA for subtractions when the difference between operand exponents is less than or equal to two.

A floating-point exponent unit (EXP) 160 couples to PIP 154 and ADD 158. EXP 160 receives the exponents of the operands from PIP 154, estimates an output exponent based on the operation being performed and the exponents of the operands, and adjusts the estimated output exponent based on the rounding and normalization performed on the mantissa (e.g., by MUL 156 and ADD 158). EXP 160 also performs other functions, such as overflow/underflow prediction and checks.

A floating-point divide/square-root unit (DSQ) 162 couples to MUL 156 and operates on the mantissas for divide and square-root instructions. DSQ 162 is designed to implement a particular algorithm (e.g., a radix-2 SRT or a radix-4 SRT algorithm).

A floating-point control unit (CTL) 164 is the control unit for FPU 110. CTL 164 receives floating-point instructions and directs the operation of various units within FPU 110 to generate the proper output.

Figure 2:
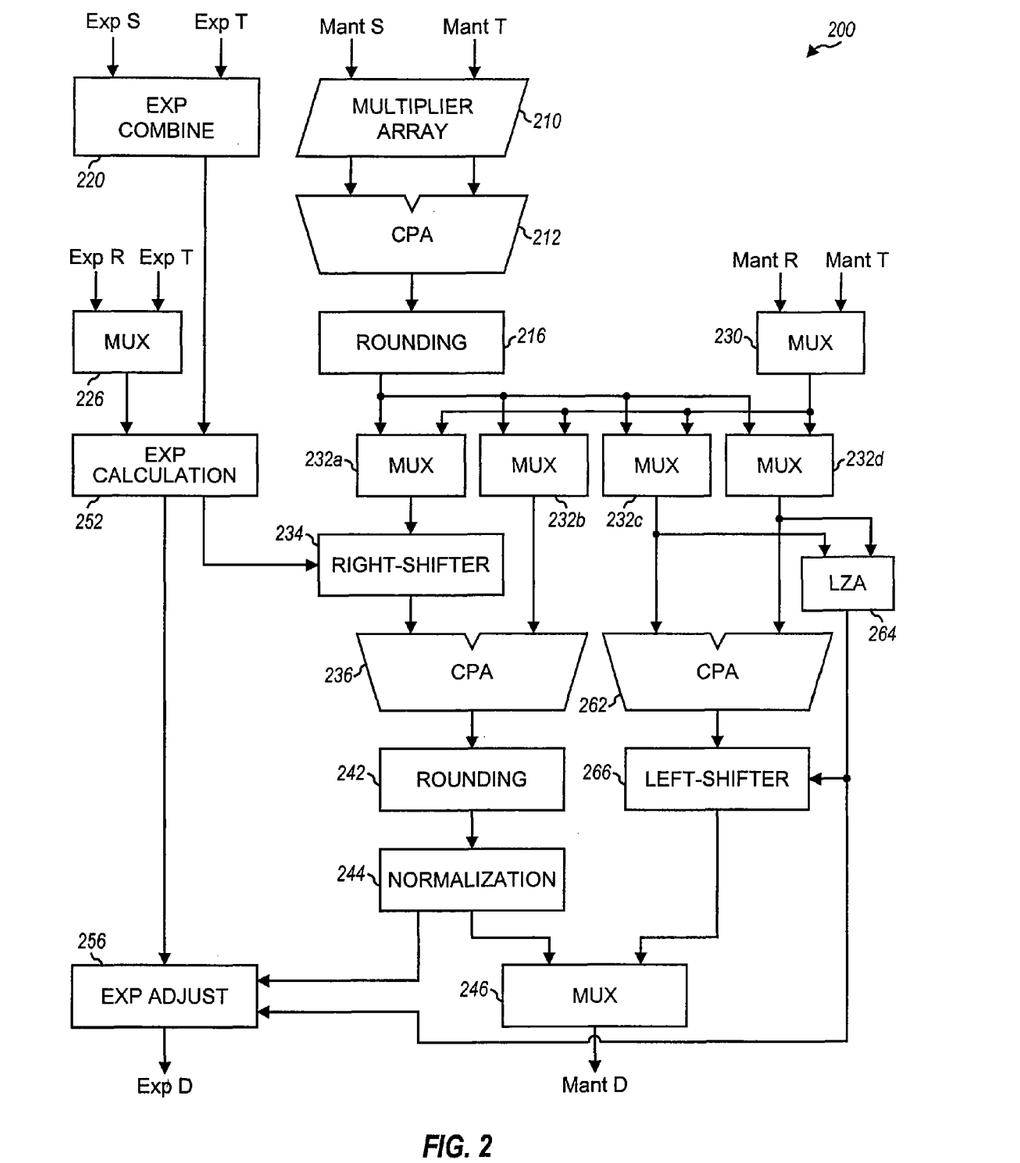
FIG. 2 shows a block diagram of an embodiment of a FPU capable of performing add, multiply, and multiply-add operations in accordance with the invention.

FIG. 2 shows a block diagram of an embodiment of a floating-point unit (FPU) 200 capable of performing add, multiply, and multiply-add (Madd) operations. FPU 200 represents a portion of FPU 100 shown in FIG. 1. FPU 200 includes a multiplier unit coupled to an adder unit. Support circuitry, such as that shown in FIG. 1, is not shown in FIG. 2 for simplicity. The multiplier unit includes a multiplier array 210, a carry-propagation adder (CPA) 212, a rounding unit 216, and an exponent combine unit 220. The adder unit includes the remaining units shown in FIG. 2. FPU 200 includes several features that increase accuracy, simplify the hardware design, and improve operational performance, as described below.

At any given moment, FPU 200 can be configured to perform one of at least three different operations including addition, multiplication, and Madd. These operations are expressed by the following:

$$Fd = Fs \pm Ft,$$

$$Fd = Fs \cdot Ft, \text{ and}$$

$$Fd = \pm((Fs \cdot Ft) \pm Fr),$$

where Fd is the resultant output and Fr, Fs, and Ft are three input operands. The Madd operation can be further decomposed into the following operations and their corresponding names:

$$Fd = (Fs \cdot Ft) + Fr, \text{ MADD}$$

$$Fd = (Fs \cdot Ft) - Fr, \text{ MSUB}$$

$$Fd = -((Fs \cdot Ft) + Fr), \text{ N MADD}$$

$$Fd = -((Fs \cdot Ft) - Fr), \text{ N MSUB},$$

As shown in FIG. 2, the mantissas, Mant S and Mant T, for two operands are provided to multiplier array 210. Array 210 can implement, for example, a Booth or modified Booth algorithm, and can include partial product generation logic and a number of carry-save adders. The partial product generation logic produces partial products based on the mantissas. The carry-save adders add a number of partial products together and send the outputs to other carry-save adders in a tree-like fashion until only two numbers are left, the final sum and carry. In a specific implementation, the carry-save adders take in four terms and combine them into two, but other configurations are possible.

Array 210 thus multiplies the two operands and provides the product in sum-and-carry format to CPA 212. CPA 212 combines the sum and carry and provides the resultant mantissa to rounding unit 216 that processes the mantissa based on a specified operating mode of the FPU. The operation of rounding unit 216 is further described below. The processed mantissa comprises the output mantissa from the multiplier unit.

The exponents, Exp S and Exp T, of the two operands are provided to exponent combination unit 220 that combines the exponents for a multiply operation. The combined exponent from unit 220 comprises the output exponent from the multiplier unit.

In an embodiment, for improved performance (i.e., faster operating speed), the adder unit includes a prescale adder (PSA) and a massive cancellation adder (MCA) operated in parallel. Depending on the characteristics of the operands, the output from either the PSA or MCA is selected.

To perform a floating-point addition, the mantissas of the two operands are typically aligned by shifting one of the mantissa and adjusting its exponent until the exponents of the two operands are equal. The mantissas are then combined (e.g., added or subtracted), and the resultant mantissa is normalized. The number of shifts prior to the combination can be large (e.g., when adding a large number with a small number), and the number of shifts after the combination can also be large (e.g., when subtracting two operands having similar magnitudes). The PSA and MCA are designed to efficiently process most input conditions, including these two extreme conditions.

For the PSA, the mantissa from rounding unit 216 is provided to MUXes 232a and 232b. The mantissas for operands R and T are provided to a MUX 230 that selects one of the mantissas, based on the operation to be performed, and provides the selected mantissa to MUXes 232a and 232b. MUX 232a selects the mantissa of the smaller operand and provides the selected mantissa to a right-shift unit 234. MUX 232b selects the mantissa of the larger operand and provides the selected mantissa to a CPA 236.

The exponents of operands R and T are provided to a MUX 226 that selects one of the exponents based on the operation to be performed. The selected exponent from MUX 226 and the combined exponent from unit 220 are provided to an exponent calculation unit 252 that determines the difference between the two exponents and a preliminary result exponent. Determination of the preliminary result exponent is dependent upon the arithmetic equation being performed, and is further described in the aforementioned U.S. patent application Ser. No. 09/363,638. The preliminary result exponent (e.g., the larger exponent when performing an add operation) is provided to an exponent adjustment unit 256 and the exponent difference is provided to right-shift unit 234 that shifts the mantissa of the smaller operand to the right by the indicated exponent difference. The shifted mantissa is provided to CPA 236 that combines the two mantissas and provides a combined mantissa to a rounding unit 242. Rounding unit 242 rounds the combined mantissa and provides the rounded mantissa to a normalization unit 244.

The mantissa from CPA 236 can be in the 01.xxx-xxxx, 1x.xxx-xxxx, or 0.1xxx-xxxx (from subtraction) format. Normalization unit 244 normalizes the result to the 01.xxx-xx format by performing a 1-bit right-shift or left-shift, if necessary. The exponent is adjusted by exponent adjustment unit 256, as necessary, based on the normalization performed by normalization unit 244.

The MCA portion of FPU 200 includes a CPA 262, a leading zero anticipator (LZA) 264, and a left-shift unit 266. For the MCA, the mantissas from rounding unit 216 and MUX 230 are provided to MUXes 232c and 232d. MUXes 232 facilitate a small shift of one of the mantissas, based on the exponent difference, to align the mantissas. MUXes 232 are also used to select one of the mantissas for inversion in subtraction operations (the inverter is not shown in FIG. 2 for simplicity). The outputs from MUXes 232c and 232d are provided to CPA 262 and LZA 264. CPA 262 combines the two mantissas and provides a combined mantissa to left-shift unit 266. LZA 264 anticipates the number of leading zeros in the resultant mantissa, based on the input operands. The output from LZA 264 is encoded into a control signal that defines the number of shifts for left-shift unit 266. The control signal is also provided to exponent adjust 256 to adjust the exponent.

The outputs from normalization unit 244 and left-shift unit 266 are provided to a MUX 246 that selects the output from the PSA or MCA as the output mantissa from FPU 200. The adjusted exponent from unit 256 comprises the output exponent from FPU 200. The operation of FPU 200 is further described in the aforementioned U.S. patent application Ser. No. 09/364,514.

FIG. 2 shows a Madd architecture in which two rounding operations can be performed, one after the multiply operation and the other after the add operation. This Madd architecture can generate Madd results that fulfill the IEEE rounding requirements, as if the multiply and add were executed separately.

Figure 3A:
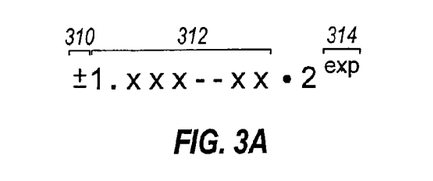
FIG. 3A shows a representation of a floating-point number.

FIG. 3A shows a representation of a normalized floating-point number. The representation includes a sign bit 310, a mantissa 312, and an exponent 314. A normalized floating-point number is represented by a mantissa having a one (1) to the left of the binary point (i.e., the integer portion of the mantissa) and a 1.xxx-xx format, where each "x" represents one bit that is either a one or a zero. As defined by the IEEE standard, the fractional portion "xxx-xx" represents 23 bits after the binary point for normalized single precision numbers and 52 bits for normalized double precision numbers. The normalized mantissa has a range of between 1.0 and 2.0 (i.e., $1.0 \leq$ mantissa$<2.0$).

The IEEE standard defines the representation for floating-point numbers. For normalized numbers, the IEEE standard mandates storing only the fractional portion of the mantissa (i.e., the "xxx-xx" portion in FIG. 3A). The leading one (1) to the left of the binary point is implicit and not stored.

Figure 3B:
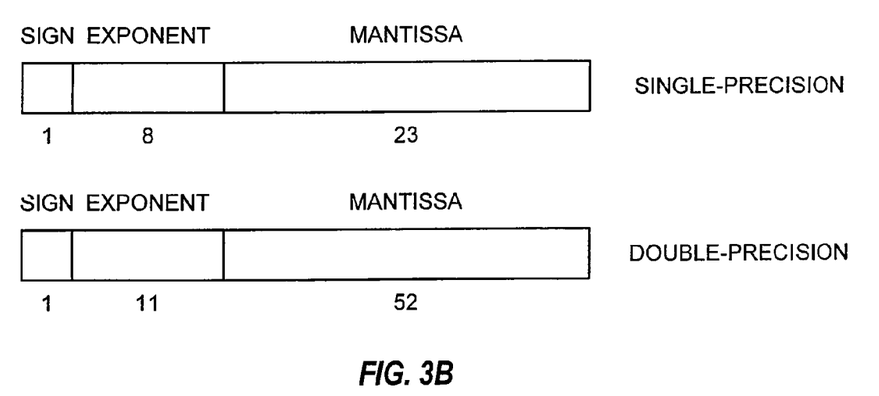
FIG. 3B shows representations for single and double-precision floating-point numbers as defined by the IEEE standard.

FIG. 3B shows representations for single and double-precision floating-point numbers as defined by the IEEE standard. The IEEE standard defines the number of bits to be used for the exponent and for the fractional portion of the mantissa, for single (32-bit) and double (64-bit) precision floating-point numbers. As shown in FIG. 3B, the single-precision representation includes three components: a single sign bit (sign), an 8-bit exponent (exp), and a 23-bit mantissa (mant). The double-precision representation includes a single sign bit (sign), an 11-bit exponent (exp), and a 52-bit mantissa (mant). A floating-point number (y) can be expressed as:

$$y = (-1)^{sign} \cdot mant \cdot 2^{exp}. \quad \text{Eq. (1)}$$

Figure 4A:
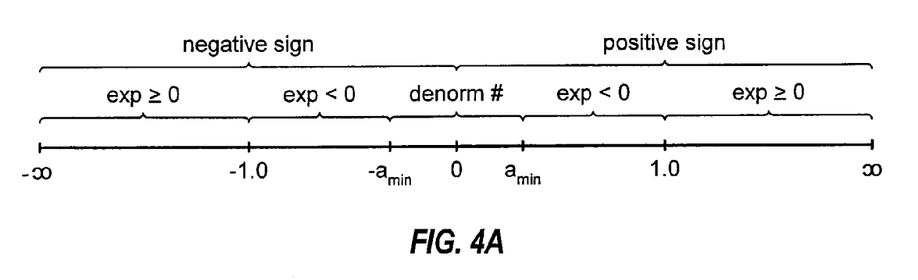
FIG. 4A shows a diagram of a line that graphically represents all real numbers.

FIG. 4A shows a diagram of a line that graphically represents all real numbers. It should be noted that this line representation is not drawn to scale. Generally, real numbers range from negative infinity ($-\infty$) to positive infinity ($+\infty$). In the line representation shown in FIG. 4A and for the floating-point expression shown in equation (1), numbers greater than 0.0 (i.e., y>0.0) are represented by a positive sign bit (i.e., sign=0) and numbers less than 0.0 (i.e., y<0.0) are represented by a negative sign bit (i.e., sign=1). Numbers having an absolute value greater than 1.0 (i.e., |y|>1.0) are represented by a positive exponent (i.e., exp$\geq$0) and numbers having an absolute value less than 1.0 (i.e., |y|<1.0) are represented by a negative exponent (i.e., exp<0).

For floating-point representations having finite resolution (such as those shown in FIG. 3B with 32 bits for single-precision and 64 bits for double-precision), only numbers within a particular range of values can be represented as normalized number using the expression shown in equation (1). This range is defined by a maximum normalized value $a_{max}$ and a minimum normalized value $a_{min}$. For single-precision numbers, $a_{max}$ is slightly smaller than $2^{+128}$ and $a_{min}=2^{-126}$. Some numbers between zero and the minimum normalized value (i.e., $a_{min}>y>0.0$) can be represented as denormalized numbers, which are described below. Special representations are used for zero (0.0) and for some numbers greater than the maximum normalized value (e.g., infinity).

Figure 4B:
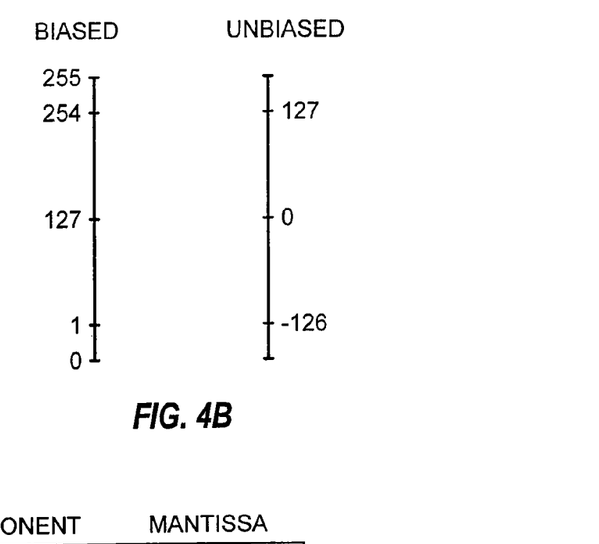
FIG. 4B shows a diagram of an exponent representation for single-precision numbers in accordance with the IEEE standard.

FIG. 4B shows a diagram of an exponent representation for single-precision numbers in accordance with the IEEE standard. To obtain both positive and negative exponent values with a binary representation, the represented exponent is offset with a bias value. For single-precision numbers, the IEEE standard defines the exponent bias value to be 127. Thus, the actual (i.e., unbiased) exponent value is equal to the represented (i.e., biased) exponent value (i.e., as stored in the exponent portion shown in FIG. 3B) minus the exponent bias value of 127. For example, the biased exponent values of 254, 127, and 1 correspond to the unbiased exponent values of +127, 0, and −126, respectively. In accordance with IEEE standard, exponent values of all ones (e.g., 255) and all zeros (e.g., 0) are used to represent special cases, as described below. Thus, normalized numbers that can be represented have exponents within the range of +127 to −126.

Figure 5A:
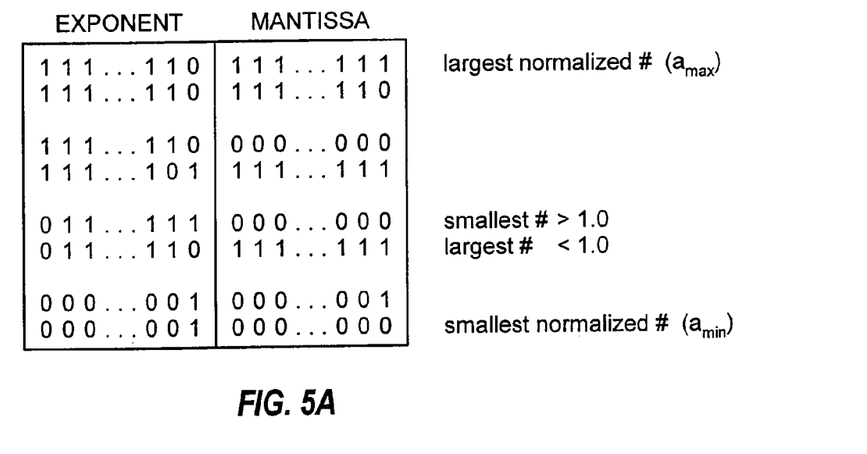
FIG. 5A shows the representations for some normalized numbers.

FIG. 5A shows the representations for some normalized numbers. As noted above, a normalized number has a mantissa that conforms to the 1.xxx-xx format, where the bit to the left of the binary point is a one (1) and each "x" to the right of the binary point represents a single bit that can be either a one (1) or a zero (0). Generally, a normalized number has a biased exponent that is within the defined range (e.g., between 254 to 1 for single-precision, which corresponds to a biased exponents of +127 to −126, respectively). The biased exponent value of 0 is reserved for representing zero (i.e., y=0.0) and denormalized numbers, as described below.

The largest normalized number (i.e., $a_{max}$) has a biased exponent of 111 . . . 110 (corresponding to an unbiased exponent of +127 for single-precision) and a mantissa of all ones (corresponding to a mantissa value of 1.111 . . . 11, since a "1" to the left of the binary point is implicit for a normalized number). It should be noted that the all ones exponent is reserved for special representations. The next largest number that can be represented has the same exponent value (e.g., unbiased exponent of +127 for single-precision) and a mantissa value that is one least significant bit (LSB) less than that of the largest normalized number (i.e., 1.111 . . . 10). Generally, for decreasingly smaller numbers, the fractional part of the mantissa is decremented by one from all ones to all zeros. When the fractional part is all zeros, the next smaller number is expressed by resetting the fractional part back to all ones and decrementing the exponent value by one. This process continues until the smallest value is reached, which is represented by an exponent of 000 . . . 001 and a fractional part of all zeros.

Figure 5B:
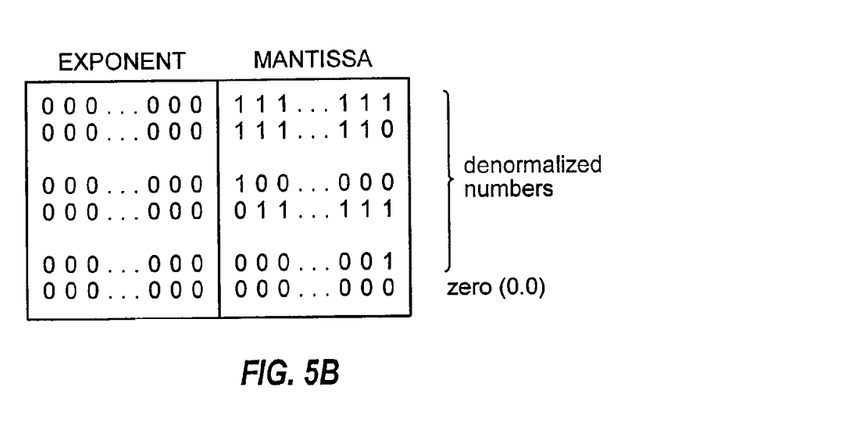
FIG. 5B shows the representations for some denormalized numbers and for zero (0)

FIG. 5B shows the representations for some denormalized numbers and for zero. As noted above, a zero real number (i.e., y=0.0) is represented by an all-zero exponent and an all-zero mantissa. To extend the range of numbers that can be represented, the IEEE standard defines the representation of denormalized numbers using the all-zero exponent and non-zero mantissas. The denormalized mantissa has a format of 0.xxx-xx, where the bit to the left of the binary point is a zero (0) and each "x" to the right of the binary point is either a one (1) or a zero (0). The largest denormalized number has a mantissa value of 0.111 . . . 11 (corresponding to a number slightly smaller than $2^{-126}$ for single-precision) and the smallest denormalized number has a mantissa value of 0.000 . . . 01 (i.e., corresponding to $2^{-149}$, for single-precision). Thus, the denormalized numbers cover a range between the minimum normalized number $a_{min}$ and zero (i.e., a range of $2^{-126}$ to $2^{-149}$ for single-precision).

Denormalized numbers extend the range of representable numbers, as indicated in the line representation in FIG. 4A, but are generally more difficult to handle in the FPU because extra processing is required to manipulate the exponent and mantissa. To facilitate handling and to simplify processing of denormalized numbers, the FPU is typically designed with additional resolution to allow for representation of IEEE-compliant denormalized numbers using internal normalized representations. For example, by increasing the exponent by one additional bit, the resolution is greatly increased and denormalized numbers can be normalized using the internal representation prior to processing. As a specific example, for single-precision, a 9-bit exponent having an unbiased exponent range of +255 to −254 can easily present the smallest IEEE denormalized number of $2^{-149}$.

Typically, numbers are stored in memory or storage in accordance with the IEEE format. As such, these numbers can be normalized numbers, denormalized numbers, or special numbers (e.g., zero and infinity). For many FPU architectures, numbers are retrieved from storage and, prior to processing by the FPU, are "unpacked" into internal normalized representations. The resultant output from the FPU may be "packed" back into the IEEE format prior to being transferred back to storage.

The IEEE standard defines guidelines to be followed to generate unique results for floating-point operations such as addition and multiplication. The IEEE standard does not define the processing for a Madd operation, which is basically a concatenation of a multiplication followed by an addition. To generate a Madd result that is IEEE-compliant, the intermediate result from the multiply portion of the Madd operation needs to be processed to generate an IEEE-compliant intermediate result that is identical to a result from an IEEE multiply operation.

Figure 6A:
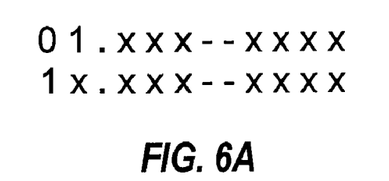
FIG. 6A shows two mantissa representations that can result from a multiply operation.

FIG. 6A shows two mantissa representations that can result from a multiply operation. When performing multiplication of two normalized mantissas (i.e., using internal representations), each being within the range of 1.0 and 2.0 (i.e., corresponding to the 1.xxx-xx format) and having N bits of precision, the resultant mantissa can range from 1.0 to 4.0 and have a 01.xxx-xxxx or 1x.xxx-xxxx format. The fractional portion "xxx-xxxx" represents up to 2N bits of precision for the unrounded multiplier result (or more than 23 bits for single precision and more than 52 bits for double precision numbers). Two bits to the left of the binary point are used to represent the range of 1.0 to 4.0. Normalization (e.g., a right-shift of one bit position) can be performed whenever the resultant operand is 2.0 or greater to maintain the mantissa within the range of 1.0 and 2.0. The exponent is adjusted accordingly whenever a shift is performed (i.e., by incrementing the exponent by one for each right shift by one bit position).

Figure 6B:
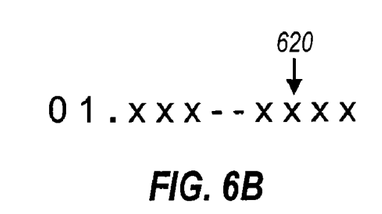
FIG. 6B shows a representation of a normalized but unrounded mantissa.

FIG. 6B shows a representation of a normalized but unrounded mantissa. Since the resultant mantissa from the multiplier array can have up to 2N bits of precision, rounding can be performed to provide a mantissa having N bits of precision, the same precision as that of the input mantissas. The IEEE standard defines the position of the bit to be rounded as well as the available rounding modes. Essentially, the mantissa is truncated to the right of a defined bit position indicated by an arrow 620, and possibly incremented at this bit position. The increment bit is generated based on a round bit, a "sticky" bit, and the current rounding mode. The round bit is the bit to the right of arrow 620, and the sticky bit is the OR of all bits to the right of the round bit. The rounding may generate a mantissa that requires re-normalization. When this occurs, a second normalization is performed.

Figure 6C:
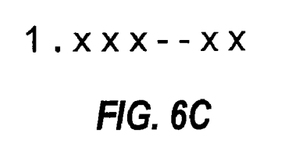
FIG. 6C shows a representation of a normalized mantissa that conforms to the IEEE standard.

FIG. 6C shows a representation of a normalized mantissa that conforms to the IEEE standard. The normalized mantissa has a range of 1.0 to 2.0 and N bits of precision.

The formats shown in FIGS. 6A through 6C can be deemed as variants of a "pseudo-normalized" format. As used herein, the pseudo-normalized format is defined by the presence of at least one bit having a value of one (1) located to the left of the binary point. Thus, the pseudo-normalized format includes 01.xxx-xx, 10.xxx-xx, 11.xxx-xx, and other formats. The pseudo-normalized format covers any number of binary digits to the right of the binary point.

As noted above, multiplication of two N-bit numbers results in a product having up to 2N bits of precision. Depending on the input operands, the product may exceed the maximum normalized value $a_{max}$ or may fall within the IEEE denormalized range. As part of the post-processing after the multiply operation, to generate an IEEE-compliant multiply result, a determination is made whether the intermediate result is a normalized or denormalized number. If the intermediate result is deemed to be a denormalized number, a denormalization followed by a rounding is performed in order to generate IEEE-compliant multiply result, which is the prerequisite for generating an IEEE-compliant Madd result.

Denormalization of the intermediate result can be performed as follows. First, the intermediate exponent associated with the intermediate result is checked to determine whether it is less than the minimum normalized exponent (e.g., less than −126 for single precision). This situation can occur when multiplying two small numbers, and the additional precision of the internal exponent representation can capture the small result. If the intermediate exponent is less than the minimum normalized exponent, the mantissa is shifted to the right and the exponent incremented by one with each bit of right-shift. The mantissa right-shift and exponent increment continues until the updated exponent is equal to the minimum normalized exponent. The mantissa is then rounded at the bit position indicated by the IEEE standard. Denormalization is necessary so that the rounding can be performed at the correct bit position as defined by the IEEE standard.

Denormalization of the intermediate result to generate an IEEE-compliant multiply result generally degrades accuracy because bits are thrown out during the denormalization process. Moreover, denormalization is a time consuming process that requires additional hardware to implement. Various approaches have been implemented to simplify the processing of denormalized number and to reduce the hardware requirement. Two of these approaches are described below.

In one approach, the FPU detects a denormalized number but the actual denormalization is performed by some other mechanisms (e.g., software). Detection of a denormalized number can be achieved using conventional techniques based upon exponent and mantissa values. Upon detection of a denormalized number, an exception occurs (i.e., a flag is raised) and corrective measures are carried out by software. The hardware detection and software processing approach can be applied to input operands as well as the intermediate result from the multiplier unit. This approach for handling denormalized numbers to generate an IEEE-compliant multiply result typically sacrifices performance (i.e., slower operating speed) for a more simplified hardware design.

In another approach, the FPU is designed with the capability to flush a denormalized number to zero. In one specific implementation of this "flush-to-zero" approach, if an operand is determined to be within the range of positive and negative minimum normalized number (i.e., between $+a_{min}$, and $-a_{min}$) it is set to zero (0.0). Other variants of the flush-to-zero approach can also be implemented. For example, in a round-to-positive-infinity rounding mode, the operand is flushed to the minimum normalized number $a_{mm}$ if it is within the range of zero (0.0) and $a_{min}$, and flushed to zero (0.0) if it is within the range of $-a_{min}$ and zero (0.0). In a round-to-negative-infinity rounding mode, the operand is flushed to $-a_{min}$ if it is within the range of $-a_{min}$ and zero (0.0), and flushed to zero (0.0) if it is within the range of zero (0.0) and $a_{mm}$. The flush-to-zero operation can be performed on denormalized input, intermediate, and output operands. This approach provides improved operating speed and requires minimal additional hardware to flush the intermediate result to zero. However, the Madd result is not IEEE-compliant and accuracy is degraded since bits are thrown out when the mantissa is flushed to zero or some other values.

Many applications do not require IEEE-compliant results from Madd operations. For these applications, the intermediate result from the multiply portion of a Madd operation can be flushed to zero, as described above. However, flushing the intermediate result to zero degrades the accuracy of the associated Madd result.

In accordance with the invention, a new approach is provided that causes rounding, but not normalization or denormalization, of the intermediate result from the multiply portion of the Madd operation. In this "Madd-flush-override" approach, the intermediate result is maintained in an internal normalized format to improve accuracy. This approach may be used exclusively or configured as one of several operating modes of a computer system. Each such operating mode may be identified, for example, by one or more bits held in a control register.

Figure 8:
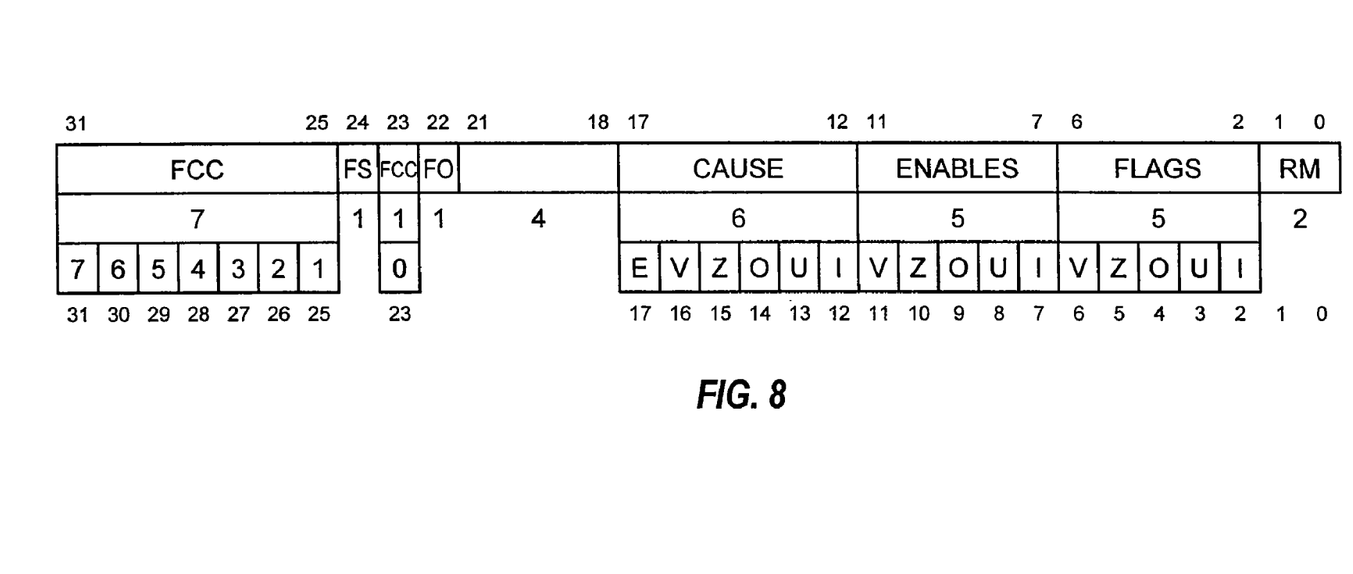
FIG. 8 shows a representation of a floating-point control status register ("FCSR") configured to store bits identifying a particular operating mode.

FIG. 8 shows a representation of a floating-point control status register ("FCSR") configured to store bits identifying a particular operating mode. The FCSR contains bit values that control the floating-point operations of the FPU. In a specific embodiment, the FCSR includes a flush ("FS") bit and a Madd-flush-override ("FO") bit located at bit positions 24 and 22, respectively, to specify IEEE-compliant, flush-to-zero, and Madd-flush-override modes. The flush-to-zero mode is activated when the FS bit is one (i.e., logic high), and the IEEE-compliant mode is activated when the FS bit is zero (i.e., logic low). When the FO bit is one, the Madd-flush-override mode is activated and a denormalized intermediate result of a Madd operation is not flushed nor denormalized according to the FS bit. The FCSR is further described in the aforementioned U.S. patent application Ser. No. 09/364,787.

Table 1 summarizes the operating modes and a designation for the FS and FO bits.

TABLE 1

Mode Definition

| MODE | FO | FS | Madd Intermediate Result Processing |
| --- | --- | --- | --- |
| IEEE-compliant | 0 | 0 | Process the intermediate result from the multiplier unit to generate IEEE-compliant intermediate output. This processing includes normalization/denormalization and rounding of the intermediate result. |
| Flush-to-zero | 0 | 1 | Flush the intermediate result to zero or some other predefined value if it is a denormalized number. |
| Madd-flush-override | 1 | X | Round Madd intermediate result in internal normalized format (also referred to herein as "pseudo-normalized" format); i.e., round but do not normalize/denormalize the intermediate result. |

Generally, the FPU can be designed to support any combination of the modes shown in Table 1 and other modes not listed. For example, the FPU can be designed to support only Madd-flush-override mode, IEEE-compliant and Maddflushoverride modes, all three modes listed in Table 1, or other mode combinations. In IEEE-compliant mode, the processing to generate the IEEE-compliant intermediate result can be performed in hardware, software, or a combination of both. The modes listed in Table 1 are described below.

In IEEE-compliant mode, the intermediate result from the multiplier unit in the FPU is normalized or denormalized, as necessary by hardware or software, and rounded. Referring to FIG. 6A, the intermediate result from CPA 212 can be in either the 01.xxx-xxxx or 1x.xxx-xxxx format. Initially, the exponent for the intermediate result is checked to determine whether the intermediate result is within the range of normalized or denormalized number. This can be achieved by comparing the exponent against the maximum exponent value $\exp_{max}$ and the minimum exponent value $\exp_{min}$ (e.g., $\exp_{max}=+127$ and $\exp_{min}=-126$ for single-precision). If the intermediate result is determined to be a normalized number, the mantissa is normalized to the 01.xxx-xxxx format. Alternatively, if the intermediate result is determined to be a denormalized number, the mantissa is denormalized in the manner described above. The normalized or denormalized mantissa is then rounded at the position indicated by arrow 620 in FIG. 6B. The normalized/denormalized and rounded intermediate result is provided to the adder unit.

In Flush-to-zero mode, the mantissa from the multiplier unit in the FPU is flushed to zero if the intermediate result is a denormalized number. Again, this determination can be achieved by checking the exponent for the intermediate result and the mantissa value. Specifically, if the exponent is less than $\exp_{min}$ and the mantissa is not equal to zero (e.g., mant≠0), the intermediate result is deemed to be a denormalized number and flushed to zero.

In Madd-flush-override mode, the intermediate result from the multiplier unit is rounded but not normalized or denormalized. In an embodiment, the rounding is performed without checking the exponent associated with the intermediate result. In an embodiment, the mantissa from rounding unit 216 is rounded regardless of whether it is a denormalized number or a number within the range defined by $a_{max}$ and $a_{min}$.

Figure 7A:
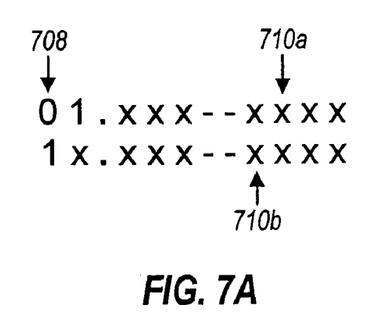
FIG. 7A shows two mantissa representations for the mantissa from a carry propagation adder (CPA) within a multiplier unit of the FPU in FIG. 2.

FIG. 7A shows two mantissa representations for the mantissa from CPA 212 in the multiplier unit. The output from multiplier array 210 can have up to 2N bits of precision to the right of the binary point and two bits of precision to the left of the binary point. Rounding unit 216 initially determines whether the bit in the most significant bit (MSB) position 708 is a zero (0) or a one (1). The position of the bit to be rounded differs by one bit position depending on whether the mantissa has the 01.xxx-xxxx or 1x.xxx-xxxx format. For a mantissa having the 01.xxx-xxxx format, rounding unit 216 rounds the bit at the position indicated by an arrow 710*a*. Alternatively, for a mantissa having the 1x.xxx-xxxx format, rounding unit 216 rounds the bit at the position indicated by an arrow 710*b*.

Figure 7B:
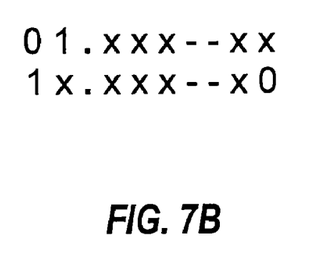
FIG. 7B shows two mantissa representations for the mantissa from the rounding unit within the multiplier unit.

FIG. 7B shows two mantissa representations for the mantissa from rounding unit 216. The rounded mantissa ranges between 1.0 and 4.0, which is approximately twice the range of a normalized mantissa. An additional bit is used to represent the additional range in the mantissa. The subsequent units (e.g., right-shift unit 234, CPA 236, rounding unit 242, and normalization unit 244 in the PSA, and CPA 262 and left-shift unit 266 in the MCA) are designed to properly process the additional bit in the mantissa.

Several advantages are obtained by performing rounding, but not normalization or denormalization, in accordance with MADD-flush-override mode. First, accuracy is improved since denormalization, which throws out bits, is not performed. In MADD-flush-override mode, the intermediate result is kept in internal normalized format to improve accuracy.

Second, some or all of the hardware can be designed with less than 2N bits of precision, since some of the precision is likely to be discarded in the rounding within the multiplier unit. For example, multiplier array 210 and CPA 212 can be implemented with less than 2N bits of precision. The subsequent units in the adder unit can also be designed to operate on number having less than 2N bits of precision, which again simplify the hardware design.

Third, implementation of these units with less precision can improve the operating speed of the FPU. As noted above, the multiplier array is typically implemented with a set of carry-save adders operated sequentially. Less processing delay, and therefore faster operating speed, may be obtain by calculating less than the full 2N bits result.

As noted above, floating-point processors capable of performing Madd operations are desirable in many applications, such as digital signal processing and graphics. Madd operations are also commonly used in arithmetic algorithms. For example, the Newton-Raphson algorithm is a convergent algorithm used for approximating reciprocals and reciprocal square roots. This algorithm performs many multiply and Madd operations. The performance of the algorithm (e.g., its speed of convergent and accuracy) is dependent on the accuracy of the Madd operation. Moreover, since the algorithm typically includes many Madd operations, the speed of the algorithm is also dependent on the speed of the Madd operation. A floating-point processor incorporating the invention can provide improved performance (i.e., accuracy and speed) when used to implement the Newton-Raphson algorithm.

The Newton-Raphson reciprocal algorithm for approximating the reciprocal of a number R is defined as:

$$\frac{1}{R} \cong X_{i+1} = X_i \cdot (2 - R \cdot X_i),$$

where i is an integer greater than one (i.e., i=1, 2, 3, . . . ), $X_i$ is an approximation from the i-th iteration, and $X_{i+1}$ is a more accurate approximation at the (i+1)-th iteration.

The Newton-Raphson reciprocal square root algorithm for approximating the reciprocal square root of a number (R) is defined as:

$$\frac{1}{\sqrt{R}} \cong X_{i+1} = \frac{(3 - R \cdot X_i \cdot X_i) \cdot X_i}{2},$$

where $X_i$ is an approximation of the reciprocal square root of the number R from the i-th iteration, and $X_{i+1}$ is a more accurate approximation at the (i+1)-th iteration.

The Newton-Raphson algorithm and its implementation using a floating-point processor is further described in the aforementioned U.S. patent application Ser. No. 09/363,637.

A floating-point instruction set architecture (ISA) for FPU 110 includes instructions for implementing the Newton-Raphson reciprocal and reciprocal square root algorithms. In one embodiment, the ISA includes three instructions for implementing an iteration of the Newton-Raphson reciprocal algorithm. The three instruction are: RECIP1 (operand1), RECIP2(operand1, operand2), and MADD (operand1, operand2, operand3).

The RECIP1(operand1) instruction enables FPU 110 to produce a result that is an estimate of the reciprocal of operand1. There are a variety of ways to produce the estimate. In one embodiment, a lookup table is used. The RECIP2 (operand1, operand2) instruction enables FPU 110 to produce a result equal to (1−operand1·operand2). The MADD instruction is a multiply-add instruction that enables FPU 110 to produce a result equal to (operand1+operand2·operand3). The RECIP1 and RECIP2 instructions are further described in U.S. patent application Ser. No. 09/364,787.

The Newton-Raphson algorithm for approximating the reciprocal of a number (R) can be implemented by configuring FPU 110 to execute the above-described instructions in the following sequence:

(1) $X_i$=RECIP1(R);
(2) IR=RECIP2(R, $X_i$); and
(3) $X_{i+1}$=MADD($X_i$, $X_i$, IR).

After FPU 110 executes the above three instructions in the above given sequence, the following quantity is obtained:

$$X_{i+1}=X_i+X_i\cdot IR=X_i+X_i(1-R\cdot X_i)=2X_i-R\cdot X_i\cdot X_i=X_i(2-R\cdot X_i),$$

which is the Newton-Raphson approximation for the reciprocal of the number R.

In an embodiment, the floating-point ISA includes four instructions for performing an iteration of the Newton-Raphson algorithm for approximating reciprocal square roots. The four instructions are: RSQRT1(operand1), RSQRT2(operand1,operand2), MUL(operand1, operand2), and MADD (operand1, operand2, operand3).

The RSQRT1(operand1) instruction enables FPU 110 to produce a result that is an estimate of the reciprocal square root of the operand. There are a variety of ways to produce the estimate. In one embodiment, a lookup table is used. The RSQRT2(operand1, operand2) instruction enables FPU 110 to produce a result equal to: (1−operand1·operand2)/2. The MADD(operand1, operand2, operand3) instruction is described above. The MUL(operand1, operand2) instruction is a multiply instruction that enables FPU 110 to produce a result equal to: operand1−operand2. The RSQRT1 and RSQRT2 instructions are further described in U.S. patent application Ser. No. 09/364,787.

The Newton-Raphson algorithm for approximating the reciprocal square root of a number (R) can be implemented by configuring FPU 110 to execute the above-described instructions in the following sequence:

(1) $X_i$=RSQRT1(R);
(2) IR1=MUL(R, $X_i$);
(3) IR2=RSQRT2(IR1, $X_i$); and
(4) $X_{i+1}$=MADD($X_i$, $X_i$, IR2).

After FPU 110 executes the above four instructions in the above given sequence, $X_{i+1}=(3-R\cdot X_i\cdot X_i)\cdot X_i/2$, which is the Newton-Raphson approximation for the reciprocal square root of the number R.

Each set of instructions shown above includes a MADD instruction. The MADD instruction has improved accuracy when executed using the MADD-flush-override mode described above. The IR value produced by the RECIP2(R, $X_i$) instruction and the IR2 value produced by the RSQRT2 (IR1, $X_i$) instruction are usually small numbers. When these numbers are internally represented in the pseudo-normalized format as shown in FIG. 6A, a great deal of precision is achieved, thereby increasing the accuracy of the approximation. Additionally, when $X_i$ and IR (or IR2) are small numbers, the multiplication of $X_i$ with IR (or IR2) during execution of a MADD instruction (as provided in the foregoing sequences) can result in a denormalized number. However, when these values are maintained in the pseudo-normalized format, accuracy is maintained since denormalization processing is typically avoided.

For clarity, the invention has described in the context of single and double-precision floating-point representations that conform to the IEEE formats. However, the invention can be adopted for used with other floating-point representations, and this is within the scope of the invention.

FPU 200 can be implemented in various manners. For example, FPU 200 can be implemented in hardware within a digital signal processor, an application specific integrated circuit (ASIC), a microprocessor, and other hardware structures.

In addition to implementations of the invention using hardware, the invention can also be embodied in an article of manufacture comprised of a computer usable medium configured to store a computer-readable program code. The program code causes the enablement of the functions or fabrication, or both, of the hardware disclosed in this specification. For example, this might be accomplished through the use of general programming languages (e.g., C, C++, and so on), hardware description language (HDL), register transfer language (RTL), Verilog HDL, VHDL, AHDL (Altera hardware description language), or other programming and/or circuit (i.e., schematic) capture tools available in the art. As a specific example, the Verilog simulator "VCS v.4.1.1" by Synopsys, Inc. was used to simulate the invention. A book entitled "A Verilog HDL Primer" by J. Bhasker, Star Galaxy Pr., 1997 provides greater detail on Verilog HDL, and is incorporated herein by reference in its entirety for all purposes. In the program code implementation, FIG. 2 can serve as an embodiment of a flow diagram.

It is understood that the functions accomplished by the invention as described above can be represented in a core that can be utilized in programming code and transformed to hardware as part of the production of integrated circuits. Also, other implementations of the invention (e.g., FPU 200) using a combination of hardware and software are also possible. Therefore, the embodiments expressed above are within the scope of the invention and should also be considered protected by this patent.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A hardware processor, comprising:
a load-store unit configured to provide data to other units of the processor, and to receive data from other units of the processor;
an integer execution unit to configured to perform integer operations; and
a floating point execution unit to configured to perform floating point operations, the floating point unit, comprising:
a multiplier unit configured to accept a first operand having a mantissa and a second operand having a mantissa, wherein the multiplier unit is further configured to:
multiply the first and second operands to produce a product value having a mantissa, and round the product value to produce a multiplier output value having an internal format that includes a mantissa, the mantissa having more than one bit to the left of the binary point, wherein at least one of the more than one bits to the left of the binary point has a value of one (1);

an adder unit configured to add the multiplier output value and a third operand to form a sum value; and an instruction fetch unit configured to fetch instructions for processing by the integer execution unit and the floating point execution unit.

2. The processor of claim 1, wherein the multiplier unit does not normalize or denormalize the product value.

3. The processor of claim 1, wherein the mantissa of the first operand and the mantissa of the second operand are represented by a first number of bits, and the mantissa of the product value and the mantissa of the multiplier output value are represented by a second number of bits, wherein the second number of bits is greater than the first number of bits.

4. The processor of claim 1, wherein the multiplier unit is configurable to operate in one of a plurality of Operating modes that include a first operating mode and a second operating mode, and wherein the multiplier output mantissa conforms to an IEEE standard in the second operating mode.

5. The processor of claim 4, wherein the multiplier output value mantissa is normalized or denormalized, as necessary, and rounded in accordance with IEEE standard.

6. The processor of claim 4, wherein the plurality of operating modes includes a third operating mode, wherein the multiplier output mantissa is flushed to zero or other predefined values when a denormalized multiplier output is detected.

7. A computer program product comprising a tangible computer usable medium, the tangible computer usable medium having encoded thereon computer readable program code to define a processor, the computer readable program code comprising:

first computer readable program code to provide a load-store unit to provide data to other units of the processor, and receive data from other units of the processor;

second computer readable program code to provide an integer execution unit to perform integer operations; and third computer readable program code to provide a floating point execution unit to perform floating point operations, the floating point execution unit, comprising:

fourth computer readable program code to provide a multiplier unit to receive a first operand having a mantissa and a second operand having a mantissa, wherein the multiplier unit:

multiplies the first and second operands to produce a product value, and rounds the product value to produce a multiplier output value having an internal format characterized in having a mantissa having more than one bit to the left of the binary point, wherein at least one of the more than one bits to the left of the binary point has a value of one (1);

fifth computer readable program code to provide an adder unit to add the product value and a third operand to form a sum value; and sixth computer readable program code to provide an instruction fetch unit to fetch instructions for processing by the integer execution unit and the floating point execution unit.

8. The computer program product of claim 7, wherein the fourth readable program code does not normalize or denormalize the product value.

9. The computer program product of claim 7, wherein the fourth computer program code represents the mantissa of the first operand and the mantissa of the second operand by a first number of bits, and represents the mantissa of the product value and the mantissa of the multiplier output value by a second number of bits, wherein the second number of bit is greater than the second number of bits.

10. The computer program product of claim 7, wherein the fourth computer readable program code provides that the multiplier unit is configurable to operate in one of a plurality of operating modes that include a first operating mode and a second operating mode wherein the multiplier output mantissa conforms to an IEEE standard.

11. The computer program product of claim 10, wherein the fourth computer readable program code provides that the multiplier output mantissa is normalized or denormalized, as necessary, and rounded in accordance with IEEE standard.

12. The computer program product of claim 10, wherein the plurality of operating modes provided by the fourth computer readable code includes a third operating mode wherein the multiplier output mantissa is flushed to zero or other predefined values when a denormalized multiplier output is detected.

13. The computer program product of claim 10, wherein the computer readable code is a hardware description language.

14. The computer program product of claim 13, wherein the hardware description language is one of VHDL and AHDL.

15. A method for performing a multiply-add operation in a processor having a floating point unit that includes a multiplier unit and an adder unit, the method comprising:

receiving a first operand having a mantissa and a second operand having a mantissa;

multiplying the first and second operands, to produce a product value;

rounding the product value to produce a multiplier output value having an internal format characterized in having a mantissa having more than one bit to the left of the binary point, wherein at least one of the more than one bits to the left of the binary point has a value of one (1); and adding the product value and a third operand to form a sum value.

16. The method of claim 15, wherein the multiplying step does not include normalizing or denormalizing the product value.

17. The method of claim 15, further comprising:

representing the mantissas of the first and second operands by a first number of bits; and representing the mantissas of the product value and multiplier output value by a second number of bits, wherein the second number of bits is greater than the first number of bits.

18. The method of claim 15, farther comprising:

operating in a one of a plurality of operating modes that include a first operating mode and a second operating mode; and conforming the multiplier output mantissa to an IEEE standard in the second operating mode.

19. The method of claim 18, further comprising:

normalizing or denormalizing the product output value mantissa, as necessary; and rounding the product value in accordance with IEEE standard.

20. The method of claim 18, wherein the plurality of operating modes includes a third operating mode, comprising:
flushing the multiplier output mantissa to zero or other predefined values when a denormalized multiplier output is detected in the third operating mode.

21. A floating point execution unit, comprising:
a multiplier unit configured to accept a first operand having a mantissa and a second operand having a mantissa, wherein the multiplier unit is configured to:
multiply the first and second operands to produce a product value having a mantissa, and
round the product value to produce a multiplier output value having an internal format that includes a mantissa, the mantissa having more than one bit to the left of the binary point, wherein at least one of the more than one bits to the left of the binary point has a value of one (1); and
an adder unit configured to add the multiplier output value and a third operand to form a sum value.

22. The floating point execution unit of claim 21, wherein the multiplier unit does not normalize or denormalize the product value.

23. The floating point execution unit of claim 21, wherein the mantissa of the first operand and the mantissa of the second operand are represented by a first number of bits, and the mantissa of the product value and the mantissa of the multiplier output value are represented by a second number of bits, wherein the second number of bits is greater than the first number of bits.

24. The floating point execution unit of claim 21, wherein the multiplier unit is configurable to operate in one of a plurality of operating modes that include a first operating mode and a second operating mode wherein the multiplier output mantissa is conformed to an IEEE standard.

25. The floating point execution unit of claim 24, wherein the multiplier output value mantissa is normalized or denormalized, as necessary, and rounded in accordance with IEEE standard.

26. The floating point execution unit of claim 24, wherein the plurality of operating modes includes a third operating mode wherein the multiplier output mantissa is flushed to zero or other predefined values when a denormalized multiplier output is detected.

\* \* \* \* \*